Feb. 28, 1956 L. THÉBAULT 2,736,524
PARACHUTE
Filed May 9, 1952 2 Sheets-Sheet 2
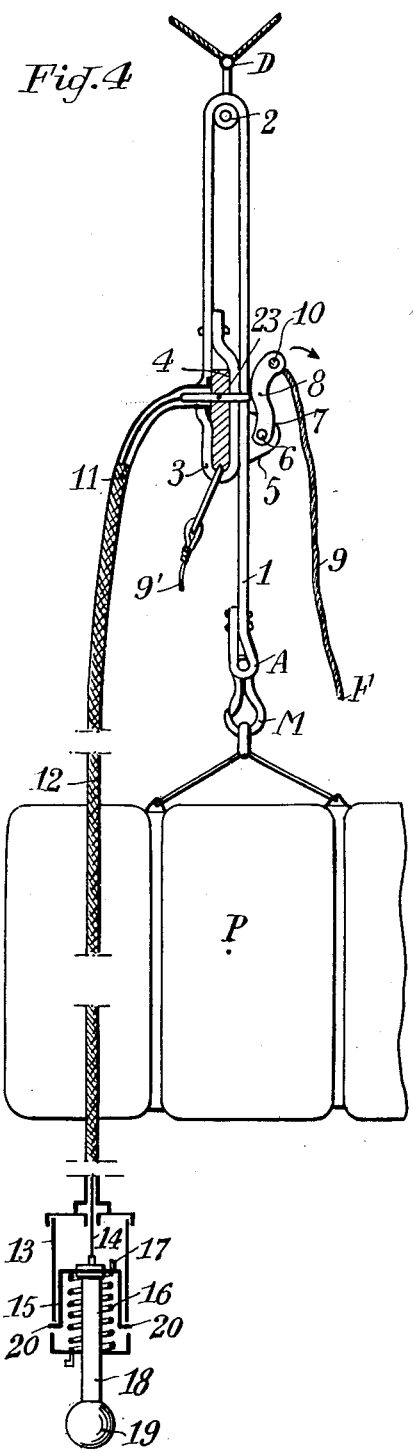
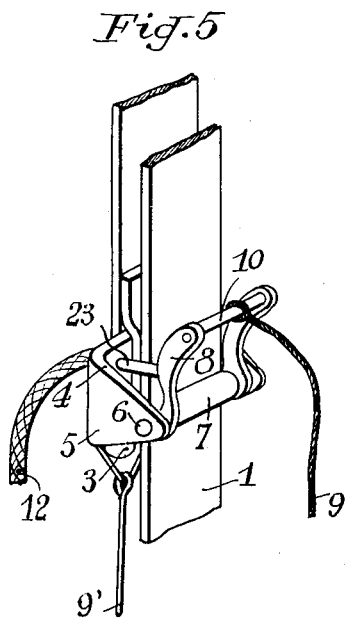
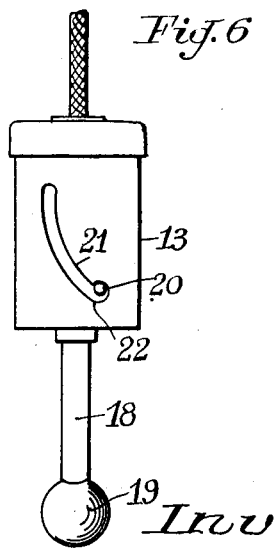
Inventor
L. Thébault
By Fiscock Downing Seebold
Attys United States Patent Office 2,736,524
Patented Feb. 28, 1956

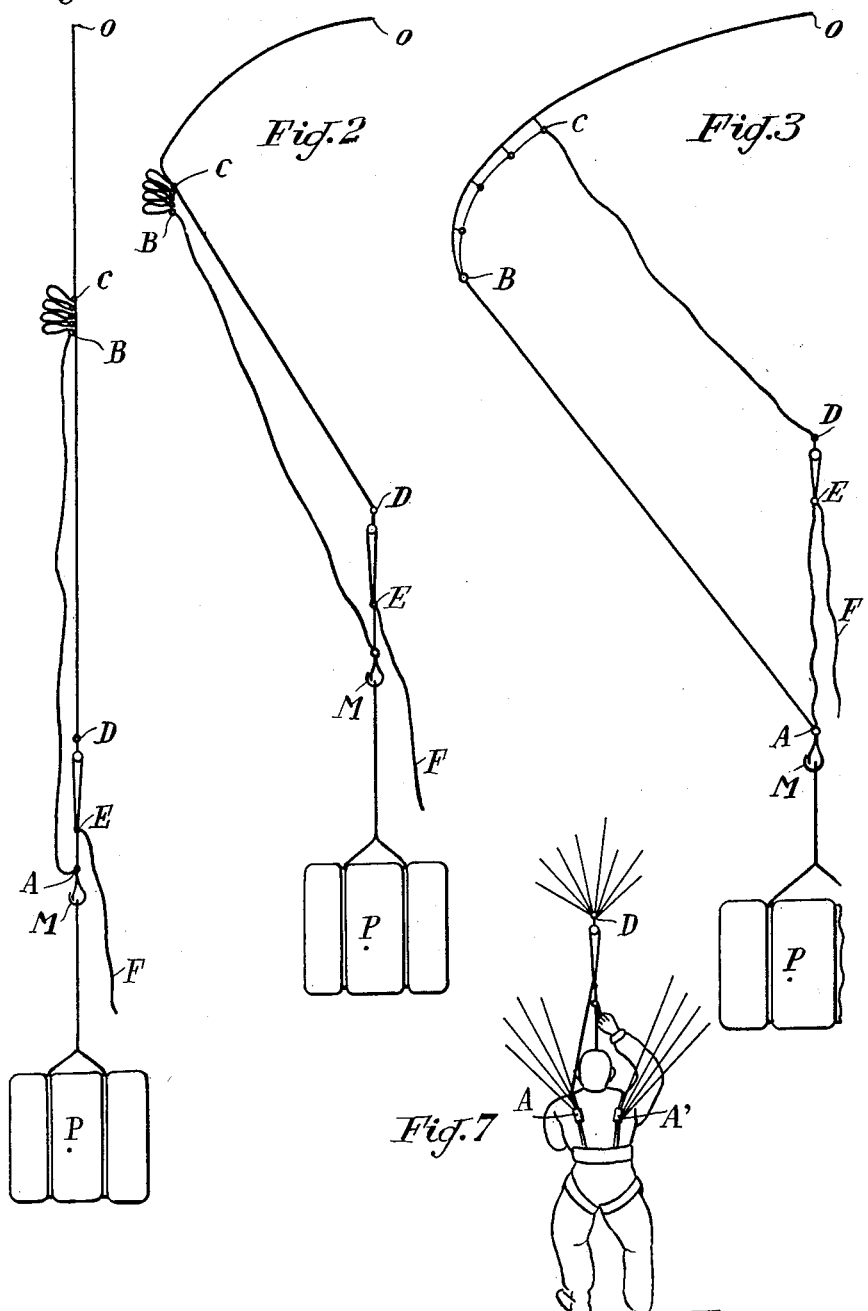

2,736,524
PARACHUTE
Louis Thébault, Sucy-en-Brie, France
Application May 9, 1952, Serial No. 286,900
5 Claims. (Cl. 244—152)

The size of the surface of the canopy of a parachute is determined so that the parachute should reach the ground at a sufficiently slow speed that it does not injure the airman or the carried load. Said speed is practically reached from the instant at which the parachute spreads out. The sudden slowing of speed that occurs at that instant produces, by inertia, a shock effect that is the more severe the larger the surface of the canopy. The effect is more accentuated if the fall occurs from a very high speed aircraft, as the translation speed composes with the fall speed. The airman, the canopy and the cords may be seriously injured.

When the speed of the aircraft is above a certain limit, delayed spreading of the parachute may be done by the airman after a sufficient time of free fall in order that the translation speed shall be sufficiently reduced. However this remedy is only partially effective for while the horizontal speed is reduced, the vertical speed in free fall is accelerated. The method is not free from danger as it depends on the coolness of the airman and moreover it is not applicable in the case of an inert load.

Another inconvenience of the ordinary parachutes is the slowness of the fall, due to the reduced speed necessary for landing, since such slowness causes drifting of the parachute and prevents reaching, with precision, a determined target.

It is impossible, with the ordinary parachutes, to altogether meet three conditions: reduced shock on spreading of the parachute, great fall speed and impact with the ground at reduced speed.

The improvement in parachutes, according to the invention, provides for all of these three conditions.

The present improvement makes it possible, without resorting to delayed and controlled spreading out, to drop a parachute from an aircraft even when the aircraft is moving at great speed, without the shock on spreading out being severe, the parachute falling at a speed intermediate between a free fall and that of a parachute unprovided with the improvement according to the invention, and nevertheless landing with the normal landing speed of said parachute.

The improvement according to the invention consists in limiting, at the instant of the spreading out of the parachute, the bearing surface of the same, then in modifying said surface during the fall and particularly in restoring it totally, at the desired instant, in order to allow the landing at the speed for which the parachute has been built.

The limitation of the size of the bearing surface of the parachute at the instant of its spreading out causes the speed of the parachute to be less reduced than it would be if the spreading out were total, the shock therefore being less severe at the spreading out and the fall being speedier, until at a suitable height, the total spreading out of the parachute occurs, giving the parachute its most reduced speed which allows landing under the best conditions.

When the total spreading out occurs, if it is rapid, a second shock occurs but this is small by reason of the relatively small difference between the speeds of the parachute before and after the total spreading out.

The limitation of the size of the bearing surface of the parachute at the spreading out is obtained, according to the invention, by folding, on itself along substantially horizontal folds, the part of the cloth between two horizontal sections of the parachute, the so-called "parallels."

The invention also relates to means for producing said folds and maintaining these folded parts together as well as for varying the size of the bearing surface of the parachute and particularly for restoring to said surface at the moment of the landing its total size.

The invention also relates, merely by way of an example, to an automatic device for obtaining said results, particularly applicable in the case when the aircraft carries an inert load.

In the drawing, Figures 1, 2 and 3 diagrammatically show a half cross-section of the parachute along a vertical plane through its axis and through one of its cords, the cloth being shown, for the sake of simplicity, by a full line.

In Figure 1, the parachute has just been taken out of its case and has not yet begun to spread out.

In Figure 2, it is shown in the position in which the spreading out is limited according to the invention.

In Figure 3, the parachute is wholly spread out.

Figure 4 is a partial view, on a larger scale, of the device that maintains the parachute in its limited spreading out position, as well as the device that produces its total spreading out.

Figure 5 is a perspective view of a detail of Figure 4.

Figure 6 is a view of the releasing mechanism that automatically produces the total spreading out.

Figure 7 shows an airman actuating the device according to the invention.

In Figures 1, 2 and 3 the outline of the parachute cloth is shown by line OB. AB is one of the normal cords that join at A where a clevis M or the like is fixed, on which the load P is hinged.

The device for limiting the spreading out of the parachute comprises an auxiliary cord BCD attached by one of its ends to the lower edge of the parachute at the point B where it meets the cord AB. Said auxiliary cord BCD passes through one or more rings sewn to the cloth.

There are as many auxiliary cords as normal cords and all the rings C are spaced at the same distance from the edge B of the cloth. The auxiliary cords, that are of the same length, join at the point D located on the vertical line OA beneath the plane of the rings C. The points A and D are united by means of a cable ADF led through a ring or a sheave attached at D and the free end DF of which is attached at a point E of the portion AD. The lengths of the auxiliary cord BCD and the portion AD are such that under the action of the load applied at point A (Fig. 1) the point B is lifted to the point C and the cloth being folded on itself between B and C, normal cord AB is slack.

At the moment of spreading out, the operation takes place as if there were no normal cords AB and the load were hinged at C of the auxiliary cords CD of a parachute, the canopy of which were reduced to OC. On spreading out, the parachute takes the shape shown in Fig. 2, the auxiliary cord CD being tightened and the normal cord AB being slack. The bearing surface of the parachute being reduced, the parachute offers to the air less resistance than that of a normal parachute and the shock on spreading out has been consequently less and the parachute falls with greater speed.

In order to secure the same slow landing as that of a normal parachute, it is sufficient to part the connection of the portions AD and DEF at E. As the portion AD becomes slack, the load is transferred to the normal cord AB, the pull at point B spreads out the part BC of the canopy which takes its normal shape BCO of Fig. 3, whereas point D is lifted to such a height that the line BCD remains equal to the length BCD of the preceding figures.

By holding in his hand the free end F and pulling on this end, an airman would be able to join the points B and C and would be able to accelerate or to reduce at will his fall speed in order to land at the most reduced speed by finally releasing the end F. If the stress exerted should be too great, it is possible to use at A a sheave around which is led the end F to the sheave at D, thus forming a pulley block which would limit the stress to the proper amount. Due to this possibility of operation, the airman could, at any time, accelerate the drop if he sees any possibility of reaching below him ground favorable for a landing or of slowing the drop in order to cross a dangerous zone by being drifted by the wind.

It is to be understood that the invention is not limited to the embodiment which has been described and that any device providing for reducing the bearing surface at the moment of spreading out of the parachute, e. g. by bringing nearer two intermediate "parallels" is within the scope of the invention.

There will now be described, by way of exemplification, a device for maintaining the bearing surface of the parachute at a reduced rate and which provides for easily restoring it to the total spreading out. Such a device is shown in Figures 4 and 5 in which A is the joining point of the normal cords AB and D is that of the auxiliary cords BCD. At A is fixed one end of a cable 1 that is led around a sheave 2 at D. The cable 1 is provided at its other end with a buckle 3 rivetted on a metal yoke plate 4. This plate 4 has lateral normal arms 5 connected by a transverse pin 6 on which is journaled an eccentric 7 provided with two lever arms 8 connected by a handle 10. In the position shown in Figs. 4 and 5, that provides for limiting the spreading out of the parachute, the levers 8 are tilted toward the portion of the cable 1 to which is hinged the load, supposed to be an airman.

The eccentric 7 presses the two portions of the cable 1 against one another sufficiently so that no slipping takes place. Moreover, the heavier the load the greater is the tightening, for the stress of the load on the cable to which it is hinged has a tendency to rotate the eccentric in the direction of the greatest tightening.

In order to restore to the parachute its whole surface, it is sufficient for the airman to lower the levers 8 by operating the handle 10 if it is within reach of his hand, if not, by exerting a pull on a rope 9 attached to the handle 10 of the levers 8. By holding the handle 10 or the rope 9 in his hand, he may let the load be progressively transferred without any shock from the auxiliary cords to the normal cords. By exerting a pull downwardly on the pulley 2 by a rope 9₁ fixed to the plate 4, he will be able to give to the parachute a reduced surface and thus pass from a slow speed to a swift speed, and conversely, in order to finally land with a slow speed.

The invention also provides an automatic device for releasing the total spreading out of the parachute soon enough before the landing, either for reducing faintness of an airman or for allowing the landing, at reduced speed, of an inert load.

Such a device is hereinafter described and shown in Figures 4, 5 and 6.

The sheath 12 of a Bowden cable 11 hanging beneath the parachute is connected at one of its ends to the plate 4 and at its other end to a casing 13. The cable 11 ends in a rigid rod 14 that enters the casing 13 and is fixed to an inner sleeve 15 that contains a coil spring 16 one end of which is attached to the sleeve 15 as the other one is attached to the casing 13. The rod 14 is extended by a rod 18 that has a larger diameter, passes through the casing 13 and carries a ball 19. The sleeve 15 carries two diametrically opposed stops 20 that are slidable in two helicoidal grooves 21. By drawing downwardly the ball 19, each stop 20 is moved in a groove 21, thus compressing the spring 16 and distorting it the stop 20 comes to rest in a relatively unstable position in a notch 22 provided in each groove 21, in which notch 22 it is retained by the pressure of the spring 16. When the ball 19 hits the ground, the casing 13, by inertia, has a tendency to move downwardly further compressing the spring 16. At that time, the stops 20 leave their notches 22 as a consequence of the torsion of the spring 16. The spring expands and the cable 11 is moved upwardly in its sheath 12. Its upper end 23 (Figs. 4 and 5) pushes a lever 8 and tilts eccentric 7 thus releasing the cable 1 which produces the total spreading out of the parachute.

It is well understood that any other automatic releasing device may be used such as a releasing device operated by a clock movement adjusted according to the altitude of the release of the parachute.

In the preceding description, there has been supposed, for the sake of simplicity, that the normal cords, as in some parachutes, are united at a single point A (Figs. 1, 2 and 3). There is easily seen (Fig. 7) that the improvement according to the invention also applies to frequent cases in which, in order to avoid the rotation of the airman, the cords are grouped in two bundles, respectively connected in A and A₁ to the sustaining sling of the airman.

For the sake of simplification, there has been supposed hereinbefore that the auxiliary cords are united at a single point D. It is well understood that they may be advantageously parted, as the normal cords, into two groups corresponding to the two groups of normal cords. In that case, each of the junction points of the groups of cords is connected, in the manner described, to a different point of the load.

In order to vary the bearing surface according to the invention, it is desirable to provide between each of the two points of junction of the auxiliary cords and their respective connection points with the load a relaxation device and to operate simultaneously on both devices the hereinbefore described operations and particularly the total releasing of the connections that produces the total spreading out of the canopy.

I claim:

1. In a parachute, the combination of a canopy provided with a plurality of rings spaced from the center of the canopy; a set of normal cords, each having one end attached to the canopy at its edge, and the other ends of said cords being connected to one another, and connected to the load of the parachute; a set of auxiliary cords, each of which auxiliary cords has one end attached to the edge of the canopy and passes freely through at least one of said rings, said auxiliary cords being connected at their other ends; a cord for connecting the connected auxiliary cords and the load of the parachute, the total length of each auxiliary cord and the cord connecting it to the load being less than the length of each normal cord so that the normal cords are relieved of any tension from the load; and manually operated means for disconnecting the connection of the auxiliary cords to the load, regardless of air pressure, to relieve the auxiliary cords of tension from the load and to apply to the normal cords the tension of the load.

2. In a parachute, the combination of a canopy provided with a plurality of rings spaced from the center of the canopy; a set of normal cords, each having one end attached to the canopy at its edge, and the other ends of said cords being connected to one another, and connected to the load of the parachute; a set of auxiliary cords, each of which has one end attached to the edge of the canopy at the point of attachment of one of the normal cords, and passes freely through a series of said rings on a meridian of said canopy, the ends of the auxiliary cords being connected; a cable for connecting the auxilary cords, at their point of connection, and the junction of the normal cords, the total length of each auxiliary cord and said cable being less than the length of each normal cord so that the normal cords are relieved of any tension from the load; and manually operated means for disconnecting said cable, to relieve the auxiliary cords of tension from the load and to apply to the normal cords the tension of the load.

3. A parachute, according to claim 2, in which a sheave is attached to said auxiliary cords at the said connecting point of said auxiliary cords, said cable being passed about said sheave so that its two portions are parallel, and said disconnecting means comprises means for releasably clamping said portions to one another, the total length of each auxiliary cord and the portion of the cable between the connection point of the normal cords and the junction point of the auxiliary cords, when said cable portions are clamped, being less than the length of said normal cords.

4. A parachute, according to claim 2, in which a sheave is attached to said auxiliary cords at the said connecting point of said auxiliary cords, said cable being passed about said sheave so that its two portions are parallel, and said disconnecting means comprises means for releasably clamping said portions to one another, the total length of each auxiliary cord and the portion of the cable between the connection point of the normal cords and the junction point of the auxiliary cords, when said cable portions are clamped, being less than the length of said normal cords, said clamping means consisting of a yoke, the bight of which is fixed to one of the said cable portions and between the arms of which the other cable portion passes, an eccentric journaled in said arms for rotation about an axis parallel with said bight and adapted to press the two said cable portions against said bight, a handle integral with said eccentric and adapted to turn said eccentric in the direction which causes it to exert pressure on said two cable portions against said bight normally, and in which said releasing means comprises a cord attached to said handle and adapted to turn said eccentric in the opposite direction.

5. In a parachute, the combination of a canopy provided with a plurality of rings spaced from the center of the canopy; a set of normal cords, each having one end attached to the canopy at its edge, and the other ends of said cords being connected to one another, and connected to the load of the parachute; a set of auxiliary cords, each of which has one end attached to the edge of the canopy at the point of attachment of one of the normal cords, and passes freely through a series of said rings on a meridian of said canopy, the ends of the auxiliary cords being connected; a cable for connecting the auxiliary cords, at their point of connection, and the junction of the normal cords, the total length of each auxiliary cord and said cable being less than the length of each normal cord so that the normal cords are relieved of any tension from the load; and means for automatically disconnecting said cable, said means being actuated by contact with the ground, to relieve the auxiliary cords of tension from the load and to apply to the normal cords the tension of the load.

References Cited in the file of this patent
UNITED STATES PATENTS

| | | |
|---|---|---|
| 2,384,127 | Nailor | Sept. 4, 1945 |

FOREIGN PATENTS

| | | |
|---|---|---|
| 128,669 | Great Britain | July 3, 1919 |
| 281,639 | Switzerland | Mar. 15, 1952 |
| 672,583 | Germany | Mar. 6, 1939 |
| 773,942 | France | Sept. 10, 1934 |
| 858,140 | France | May 6, 1940 |